Jan. 6, 1970  J. H. L. M. PIZARRO  3,488,201
FOOD CONTAINER AND METHOD OF MAKING SAME
Filed May 5, 1967

INVENTOR:
JORGE HUMBERTO LOPES MARTINS PIZARRO
BY
Karl G. Ross
ATTORNEY

United States Patent Office 3,488,201
Patented Jan. 6, 1970

3,488,201
FOOD CONTAINER AND METHOD OF MAKING SAME
Jorge H. L. M. Pizarro, Sao Paulo, Brazil, assignor of one-half to Manacas Comercial E. Agricola S/A, Sao Paulo, Brazil, a corporation of Brazil
Filed May 5, 1967, Ser. No. 636,321
Claims priority, application France, Dec. 13, 1966, 89,347
Int. Cl. B65b 7/00
U.S. Cl. 99—171               6 Claims

ABSTRACT OF THE DISCLOSURE

A food container of aluminum foil or the like, with a corrugated or otherwise uneven brim, is prepared for sealing with an adhesively coated disk of similar material by having a smooth-surfaced ring bonded to its brim with the aid of a thermoplastic (e.g. polyester) layer allowed to flow into the corrugations; the application of the sealing disk can then be performed in a quick operation which does not subject the contents of the container to prolonged heating.

---

My present invention relates to a sealable container for foodstuffs or the like as conveniently made from flat sheet material such as metal (e.g. aluminum) foil.

In the formation of a cup-shaped container body from such foils it is necessary to crimp an annular portion of the sheet which is to become the cylindrical or frusto-conical wall of the cup. The resulting corrugations also extend onto an adjoining brim which surrounds the open top of the container. In sealing the container, a circular disk-shaped lid of substantially the same diameter as the brim would have to be placed upon the latter and clamped onto it under heat and pressure to soften a heat-fusible (e.g. thermoplastic) adhesive layer on the underside of the disk. Because of the wrinkles in the brim, however, this operation will produce a hermetically sealed food package only if the adhesive is heated long enough to be able to flow into the corrugations so as to block all leakage paths.

A prolonged exposure of the contents of such containers to high temperatures, for the purpose just described, is frequently objectionable, particularly in the case of perishable food. For this reason it has not been found practical heretofore to make sealed packages from corrugated containers of aluminum foil or the like as conventionally used for other purposes, e.g. as drinking cups.

The general object of my present invention is to provide a method of making a hermetically sealed food package from a container of the type referred to with avoidance of prolonged heating of its contents.

This object is realized, pursuant to my present invention, by adhesively securing to the wrinkled brim of the container a substantially coextensive smooth-faced ring coated on its underside with a thermoplastic substance, advantageously a polyester, and heating this substance to a flowable state for a sufficiently long period to fill the wrinkles of the brim whereupon the thermoplastic substance is allowed to harden, thereby bonding the ring to the brim. The container can now be filled with food and can then be hermetically heat-sealed by means of a similarly coated lid, preferably made of the same sheet material such as aluminum foil, in a short heating step designed only to soften the adhesive layer of the lid which is being clamped onto the brim of the container. If a pressure-sensitive adhesive is used, this last heating step may be omitted entirely.

The invention will be described in greater detail with reference to the accompanying drawing in which.

Figure 1:
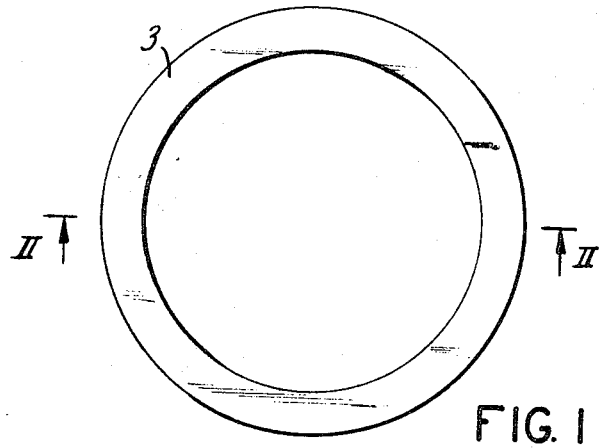
FIG. 1 is a face view of a sealing ring adapted to be applied, pursuant to my invention, to the corrugated brim of a container of the type described above.
Figure 2:
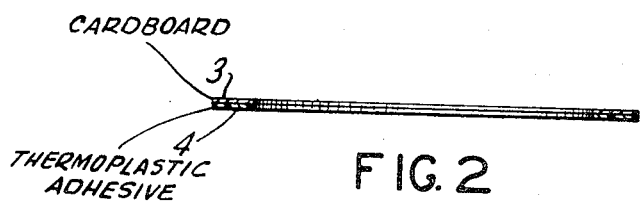
FIG. 2 is a cross-sectional view taken on the line II—II of FIG. 1.
Figure 3:
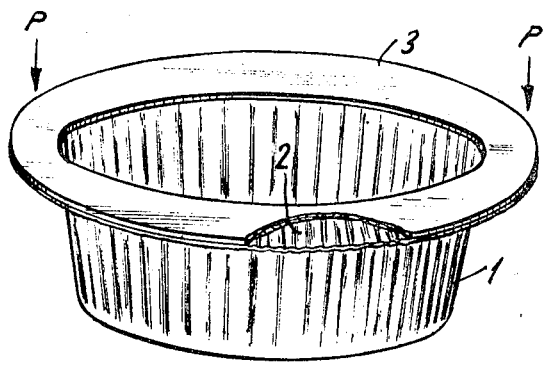
FIG. 3 is a perspective view of the container with the ring of FIGS. 1 and 2 bonded thereto but shown partly broken away to expose the wrinkled brim.
Figure 4:
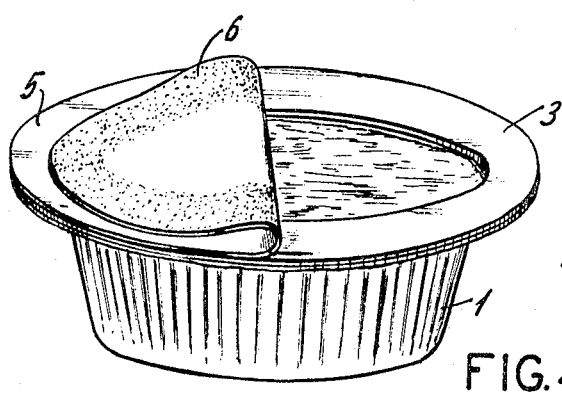
FIG. 4 is a view similar to FIG. 3, illustrating the sealing of the container by a disk-shaped lid.

In FIGS. 1 and 2 I have illustrated a ring 3 of paper, cardboard, metal foil, synthetic resin or other sheet material having a smooth upper surface, the underside of this ring being coated with an adhesive layer 4 of thermoplastic material; a wide variety of such adhesives are commercially available, an illustrative example being polyethyleneterephthalate. The ring 3, as shown in FIG. 3, is placed on the corrugated brim 2 of a container 1, e.g. of aluminum foil, whereupon the assembly is heated under axial pressure P to fuse the ring 3 onto the brim 2 and to let the adhesive 4 penetrate into the corrugations of the latter. After the adhesive has set, the container 1 can be filled. Finally, as illustrated in FIG. 4, a lid 5 of sheet material (e.g. aluminum foil) is placed on the filled container to overlie the ring 3; an adhesive coating 6 on the underside of lid 5 is then softened enough to seal the package. This last operation may be carried out manually, especially if no heating is required, or between suitable clamping jaws, e.g. in a device as disclosed in my co-pending application Ser. No. 636,322 of even date in which a heated cover has an annular rib which is brought down on the lid 5 to fit into an annular groove of a base underlying the brim 2 whereby the brim and the lid are deformed to provide a more effective seal.

The techniques herein disclosed is, of course, applicable to any sealable container whose cup has an irregular or otherwise uneven surface not readily amenable to direct adhesive bonding onto a lid.

I claim:

1. A method of making hermetically sealed food packages, comprising the steps of forming upwardly open containers with corrugated brims from sheet material, adhesively securing to the brim of each container a smooth-surfaced ring substantially coextensive with said brim and coated on its underside with a thermoplastic substance, heating said substance to a flowable state for a sufficiently long period to fill the corrugations of said brim with said substance, letting said substance harden, filling the container with food, and sealing a flat disk hermetically to the smooth-surface topside of said ring.

2. A method as defined in claim 1 wherein said substance is polyester.

3. A method as defined in claim 1 wherein said disk is sealed to said ring by a heating process substantially shorter than the flowability period of said substance.

4. A sealable container, comprising an upwardly open cup of sheet material having a corrugated brim, a smooth-surfaced ring substantially coextensive with said brim overlying the latter, and a layer of thermoplastic substance bonding said ring to said brim while filling the corrugations thereof.

5. The combination of a container as defined in claim 4 with foodstuff therein and with a flat disk of sheet material adhesively secured to the smooth-surfaced topside of said ring all around the periphery thereof.

6. A container as defined in claim 4 wherein said sheet material is a metal foil.

References Cited

UNITED STATES PATENTS

| 2,759,656 | 8/1956 | Abrams | 229—43 |
| 3,272,422 | 9/1966 | Miller | 229—43 |

FOREIGN PATENTS 226,085  6/1958  Australia.

FRANK W. LUTTER, Primary Examiner

U.S. Cl. X.R.

53—39; 229—3.5, 43